(No Model.)

P. HIEKISCH.
BICYCLE STAND.

No. 591,969. Patented Oct. 19, 1897.

Witnesses
C. H. Raeder
J. H. Griffin

Inventor
Paul Hiekisch
by James J. Sheehy
Attorney

UNITED STATES PATENT OFFICE.

PAUL HIEKISCH, OF DECATUR, ILLINOIS.

BICYCLE-STAND.

SPECIFICATION forming part of Letters Patent No. 591,969, dated October 19, 1897.

Application filed May 4, 1896. Serial No. 590,064. (No model.)

*To all whom it may concern:*

Be it known that I, PAUL HIEKISCH, a citizen of the United States, residing at Decatur, in the county of Macon and State of Illinois, have invented certain new and useful Improvements in Bicycle-Stands; and I do declare the following to be a full, clear, and exact description of the invention, such as will enable others skilled in the art to which it appertains to make and use the same.

My invention relates to improvements in bicycle stands or supports; and it has for its general object to provide a simple and inexpensive stand or support to support bicycles having wheels of various diameters in such a manner as to permit of them being tried or operated to exhibit the working of the chain, sprocket, bearings, &c., and one which, when not in use, may be compactly folded, so as to take up but a minimum amount of space.

Other objects and advantages of the invention will be fully understood from the following description and claim when taken in conjunction with the amended drawings, in which—

Figure 1:
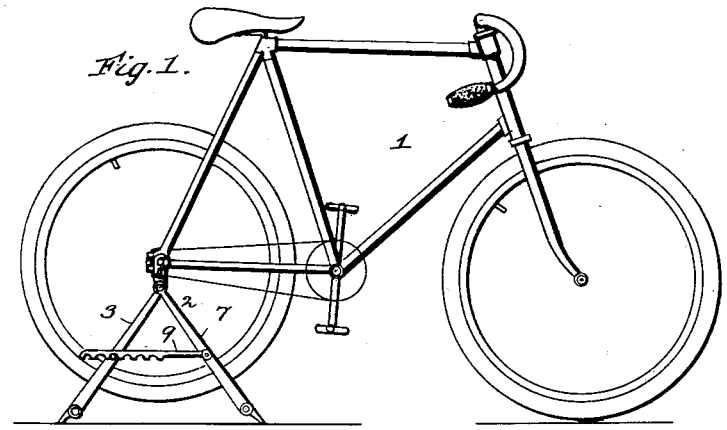
Figure 2:
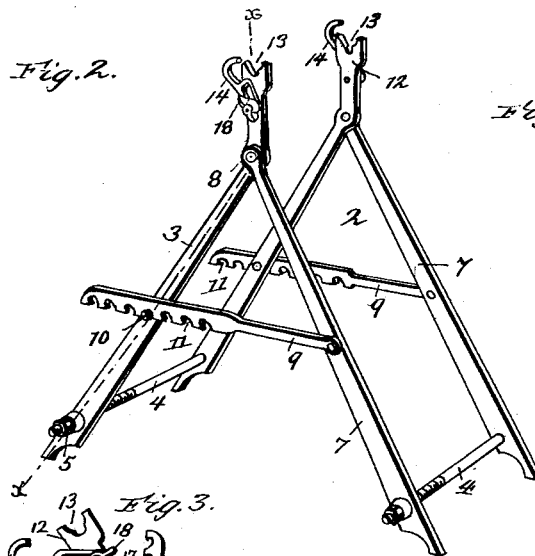
Figure 3:
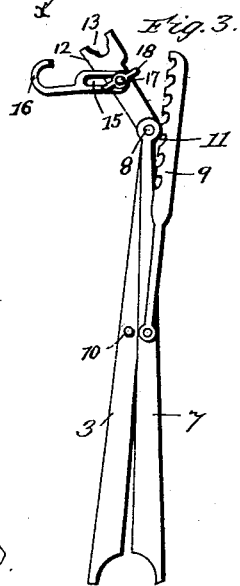
Figure 4:
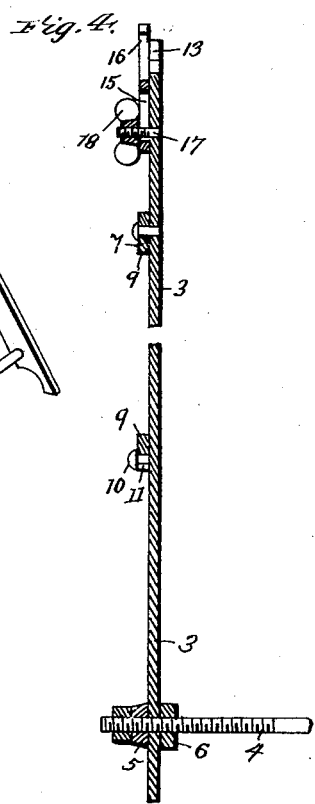

Figure 1 is a side elevation illustrating my improved stand as supporting the rear portion of a bicycle. Fig. 2 is an enlarged perspective view of the stand. Fig. 3 is a side elevation of the stand as it appears when folded, and Fig. 4 is an enlarged detail section taken in the plane indicated by the line $x\ x$ of Fig. 2.

In the said drawings similar numerals designate corresponding parts in all of the views, referring to which—

1 indicates a bicycle which forms no part of my invention and is here shown simply to show the application and manner of using my improvements, and 2 indicates my improved stand or support. This stand or support is preferably made of metal, and it comprises the legs 3, which are adjustably connected adjacent to their lower ends by the threaded rod 4, and the nuts 5 and 6, (see Fig. 4,) so as to permit of the stand being adjusted to suit bicycles of various widths, the legs 7, which are similarly connected together adjacent to their lower ends and are connected at or adjacent to their upper ends to the legs 3, in a hinged or pivotal manner, as indicated by 8, and the bars 9, which are pivotally connected to one pair of legs, (preferably the legs 7.)

The bars 9 are provided with a plurality of notches 11, preferably of the form shown, to engage studs 10 on legs 3, as shown, and consequently the lower ends of the legs 3 7 may be adjustably fixed at various distances apart and the stand thus adapted to support bicycles having wheels of various diameters a slight distance above the ground or floor.

The legs 3 terminate above the point of connection to the legs 7 in the portions 12, which are preferably disposed at an angle to the lower portions of said legs 3, in order to rest in a vertical or approximately vertical position when the legs 3 7 are spread apart, as shown in Figs. 1 and 2. These portions 12 are provided at their upper ends with seats or notches 13, designed to receive the portions of the wheel-axle which extend outside the frame, or the nuts on said extended portions of the axle; and in order to prevent a casual removal of the axle or the nuts thereon from said notches 13 I provide the keepers 14. (Better illustrated in Figs. 2 and 3 of the drawings.) The said keepers 14 are slotted, as indicated by 15, and are provided at their upper ends with hooks 16; and they are connected to the legs 3 by the threaded studs 17, which extend from said legs and through the slots 15, and the nuts 18 on said studs, as shown. By reason of this construction it will be seen that after the extended portions of the wheel-axle or the nuts thereon are placed in the notches 13 the keepers 14 may be swung up over the axle or nuts thereon, and, when the nuts 18 are tightened, will securely hold the axle in the notches and prevent casual displacement or removal of the same, which is a desideratum in this class of devices.

In using my improved stand the legs 3 and the legs 7 are adjusted and adjustably fixed at a distance apart to suit the width of the bicycle to be supported. The legs 3 and 7 are then spread apart and are adjustably fixed through the medium of the bars 9, in such a position as to suit the stand to the diameter of wheels of the machine to be supported. The extended portions of the wheel-axle or the nuts thereon are then placed in the notches 13 of legs 3, and the keepers 14 are adjusted and adjustably fixed as described. When thus supported, the bicycle is held in a perfectly upright position and a person may mount and operate it to exhibit the workings of its various parts without danger of injuring the machine or causing it to fall over or be displaced from the stand, the keepers 14 serving as will be readily observed to securely hold the extended portions of the wheel-axle or the nuts thereon in the seats 13 at the upper end of the stand-legs. The machine may also be conveniently moved from one part of a store-room to another without disconnecting it from the stand.

When not in use, the stand may be folded compactly, so as to take up but a minimum amount of space, it being simply necessary to first disengage the bars 9 from the studs 10, and then bring the legs 3 7 and the bars 9 together, as shown in Fig. 3.

With all of its advantages it will be seen that my improved stand is very simple and inexpensive, and may be sold with profit for a small expense.

When desirable, the legs 3 and 7 may be adjustably fixed with respect to connecting-rods by set-screws or other suitable devices, and in some cases the said legs may be fixedly connected to the connecting-rods.

I am well aware that it is old to hold the legs or supports of tables, clothes-driers, and the like apart by bars connected in a hinged manner to one leg or support and notched to engage a lug on the other leg or support. I am also aware that a foldable bicycle-stand comprising two members connected in a hinged manner is old, and that it is also old to provide, in conjunction with uprights notched at their upper ends, an adjustable hook for holding a bicycle in said notches. I therefore make no claim to these constructions, but

What I claim, and desire to secure by Letters Patent, is—

The herein-described adjustable and foldable bicycle-stand comprising essentially the legs 3, adjustably connected together so as to permit of them being moved toward or from each other, and having the lateral studs 10, at an intermediate point of their length and also having the upper portions 12, disposed at an angle to their lower portions and provided in their upper ends with seats, the legs 7, connected in a hinged manner with the legs 3, at the lower ends of the portions 12, thereof, and also adjustably connected together so as to permit of them being moved toward or from each other, the bars pivotally connected with the legs 7, and having notches to engage the lateral studs of the legs 3, the slotted keepers having hooks at their upper ends, and the threaded studs and nuts thereon adjustably connecting the keepers and the portions 12, of the legs 3, substantially as specified.

In testimony whereof I affix my signature in presence of two witnesses.

PAUL HIEKISCH.

Witnesses:
FRANK W. CALDWELL,
HENRY MOOK.